United States Patent [19]

Rainville

[11] Patent Number: 5,140,516

[45] Date of Patent: Aug. 18, 1992

[54] METHOD AND SYSTEM FOR RAPIDLY CHANGING THE SOURCE OF MATERIAL SUPPLIED TO A DESTINATION

[76] Inventor: Donald D. Rainville, 6291 Occoquan Forest Dr., Manassas, Va. 22111

[21] Appl. No.: 461,273

[22] Filed: Jan. 5, 1990

[51] Int. Cl.$^5$ ............................................. G06F 15/46
[52] U.S. Cl. .................... 364/140; 364/143; 364/479; 141/104
[58] Field of Search ............... 364/140, 143, 468, 473, 364/478, 479, 502, 469; 222/55, 135; 366/160, 179, 181, 182, 139; 406/22, 23, 168, 3, 198; 141/2, 104, 103

[56] References Cited

U.S. PATENT DOCUMENTS

| | | | |
|---|---|---|---|
| 412,985 | 10/1889 | Schnitzler | 406/1 |
| 1,844,642 | 2/1932 | Dornbrook | 406/1 |
| 2,554,583 | 4/1951 | McFall | 406/1 |
| 2,818,305 | 12/1957 | Pursel et al. | 406/22 |
| 3,224,812 | 12/1965 | Bozich | 406/1 |
| 3,406,928 | 10/1968 | Thorburn | 406/198 |
| 3,854,778 | 12/1974 | Trythall | 406/3 |
| 4,415,297 | 11/1983 | Boring | 406/168 |
| 4,705,083 | 11/1987 | Rossetti | 364/479 |
| 4,756,348 | 7/1988 | Moller | 222/55 |
| 4,835,701 | 5/1989 | Ohiwa et al. | 364/479 |
| 4,850,703 | 7/1989 | Hanaoka et al. | 366/160 |
| 4,862,649 | 9/1989 | Davis et al. | 414/221 |
| 4,913,198 | 4/1990 | Hayahara et al. | 141/83 |
| 5,006,995 | 4/1991 | Toschi et al. | 364/468 |
| 5,027,869 | 7/1991 | Tsumura et al. | 141/104 |

Primary Examiner—Jerry Smith
Assistant Examiner—Paul Gordon

[57] ABSTRACT

A system for transporting material in particulate form from one of a number of sources to one of a number of processing stations, which system includes source tubes separated from each source by a material control valve, destination tubes leading to each processing station, and a rotary valve connecting source tubes and destination tubes. A pump is connected, by an air line which has a valve corresponding to each processing station, to each destination tube. A controller controls the pump, material control valves, rotary valves, and air valves so as to establish a flow of air from a selected source tube to a selected processing station and enable the introduction of a selected amount of material into a source tube while maintaining the flow of air until the material has reached the processing station. In an alternative embodiment, a flexible hose may be employed to connect a selected source tube and a selected destination tube.

8 Claims, 5 Drawing Sheets

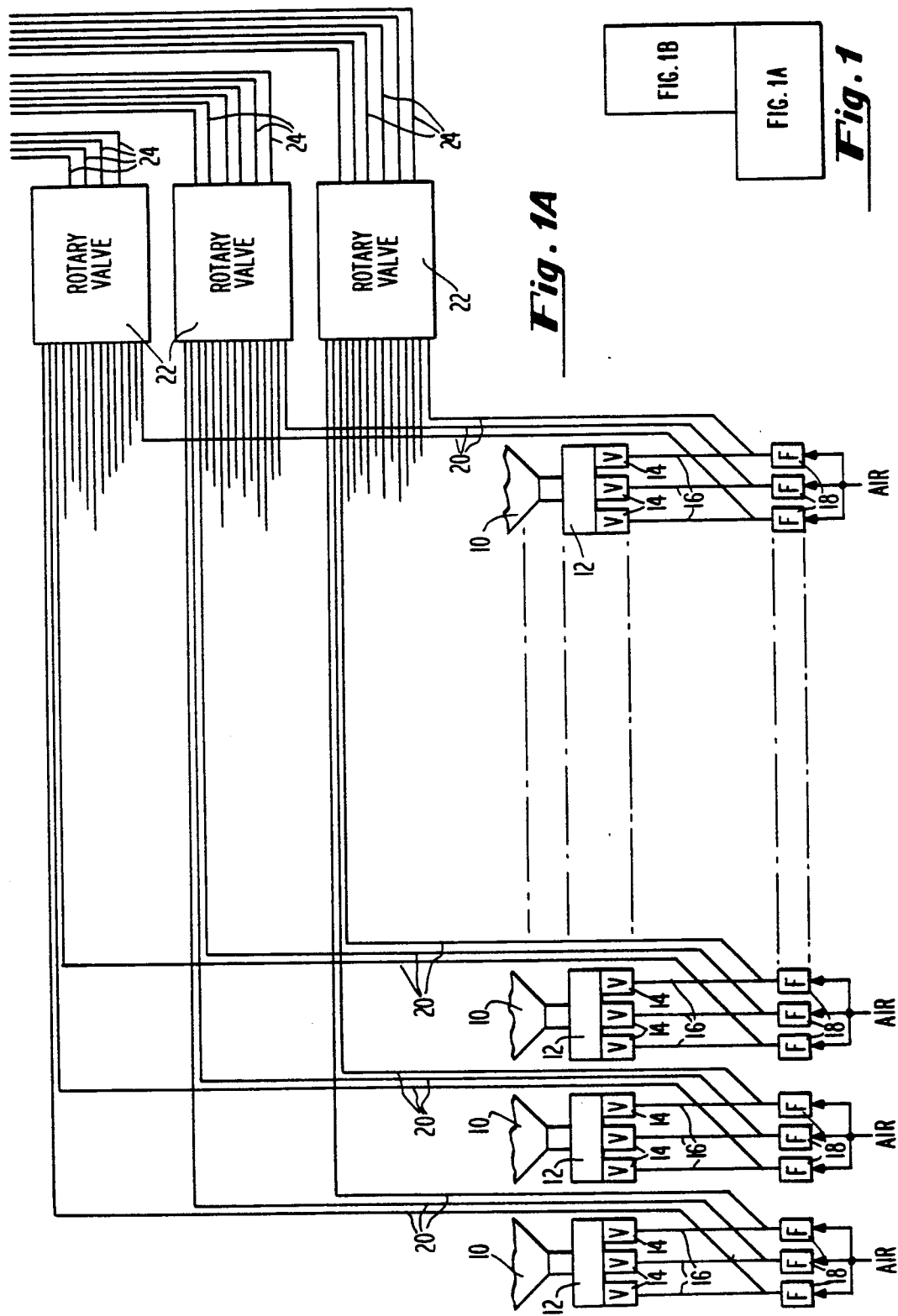

METHOD AND SYSTEM FOR RAPIDLY CHANGING THE SOURCE OF MATERIAL SUPPLIED TO A DESTINATION

BACKGROUND OF THE INVENTION

This invention relates to the supplying of material in particulate form from one of several sources to one of several destinations by pneumatic conveying. More particularly, this invention relates to a system and method for supplying plastic in particulate form from several material dryers to several individual processing stations having processing equipment, such as injection molding machinery. This invention also relates to such a system and method where either the source or the destination may be changed easily.

In the manufacture of plastic articles, it is often desirable to produce articles of the same shape but using different plastic materials or different colors of the same plastic material. One way in which to achieve this result is to have several identical molds, each of which is attached to a holding area for a different type of plastic. Then each type of plastic may be delivered to the particulate mold when desired. However, this configuration does not entail use of the molds to their full capacity, resulting in unnecessary expense among other problems. Alternatively, there may be provided several sources of material which may feed a single injection molding machine. However, in this configuration, a shutdown of a single injection molding machine means that several sources of supply are not in use, which is wasteful of both time and money.

One solution to these problems would be the provision of a number of sources that can reach a number of processing stations. However, in various applications, the presence of hygroscopic materials in lines leading from sources to destinations requires that all material be cleared from the lines. Many plastics in particulate form are hygroscopic. Such materials, when not in a temperature and humidity controlled environment, can absorb water from the air. If such materials remain in the line or tube used for conveying the material water will be absorbed. Moreover, material that is being maintained in a hopper at a processing station is generally in an uncontrolled environment. The longer that material remains in such an uncontrolled environment at a processing station, the more moisture is absorbed. If materials that have absorbed water are included in the material used in injecting molding, the resulting molded materials will be of less than acceptable quality.

Changing materials presents additional problems. There is necessarily at least one section of tubing through which different types of plastic material will pass. In these sections, residual material may be different from material newly entering the tube. Thus, impurities will be found in the material used in injection molding. As a result, articles of less than acceptable quality will be produced.

Disassembly and cleaning of the system would eliminate the problems associated with residual material. However, such disassembly and cleaning are expensive and time-consuming, since shutdown of the material delivery system is required. Such shutdowns would increase the length of time between deliveries of material to processing stations. In order to avoid shutdowns at processing stations to wait for material as a result of the increased length of time between deliveries, it is desirable to increase the amount of material stored at the processing station. Increasing the quantities of material stored at the processing station will increase the amount of time such material is in an uncontrolled environment resulting in absorption of water and poor product quality.

OBJECTS OF THE INVENTION

It is therefore an object of this invention to provide a system for transporting material in particulate form from a source to a processing station which allows rapid changing of the type of material being supplied to a processing station.

It is a further object of this invention to provide a system for transporting material in particulate form from a source to a processing station wherein each source may supply more than one processing station.

It is a still further object of this invention to provide a system for transporting material in particulate form from a number of sources to a number of processing stations wherein each source may supply more than one destination and which avoids having hygroscopic materials remain in an uncontrolled environment.

It is a further object of this invention to provide a system for transporting materials in particulate form from any one of a number of sources to anyone of a number of processing stations wherein the source and processing station may be changed rapidly.

It is a further object of this invention to provide a system for transporting material in particulate form from one of a number of sources to one of a number of processing stations wherein the source and processing stations may be changed rapidly but where no residual material remains in tubes used for conveying materials.

SUMMARY OF THE INVENTION

A system for delivering predetermined amounts of material in particulate or pulverulent form from a selected one of several sources to a selected one of several destinations includes a number of source tubes, each of which is in proximity to a source, a number of destination tubes, each of which is in communication with a destination at a destination end, connecting means whereby each source tube may be, at a given time, in communication with any one of a number of destination tubes, air flow means for providing a flow of air through a selected source tube, the connecting means, and a destination tube which is in communication with the selected source tube. The system further includes introducing means for introducing material from each source to one of the source tubes, and control means for controlling the connecting means so as to render a selected source tube in communication with a selected destination tube, controlling the air flow means so as to establish a flow of air through the selected source tube, the connecting means, and the destination tube; controlling the introducing means so as to introduce a selected quantity of material from a selected source into the selected source tube; controlling the air flow means so as to maintain the flow of air for a predetermined period of time sufficient to allow the selected quantity of material to reach the selected destination and continuing the air flow for a predetermined period of time sufficient to remove substantially all residual material from the selected source tube, the connecting means and the selected destination tube.

A method for transporting a selected amount of material in particulate or pulverulent form from a selected one of a number of sources to a selected one of a number of destinations includes the steps of providing a flow of a fluid through a tube to the selected destination, introducing a selected amount of material from a selected source into the flow of fluid, and maintaining the flow of fluid until a predetermined period of time sufficient to allow the selected amount of material to reach the selected destination has elapsed.

BRIEF DESCRIPTION OF THE DRAWINGS

FIGS. 1, 1A and 1B are a schematic representation of a system for transporting material in particulate form from one of a number of sources to one of a number of destinations according to the invention.

DETAILED DESCRIPTION OF THE PREFERRED EMBODIMENT

Figure 1B:
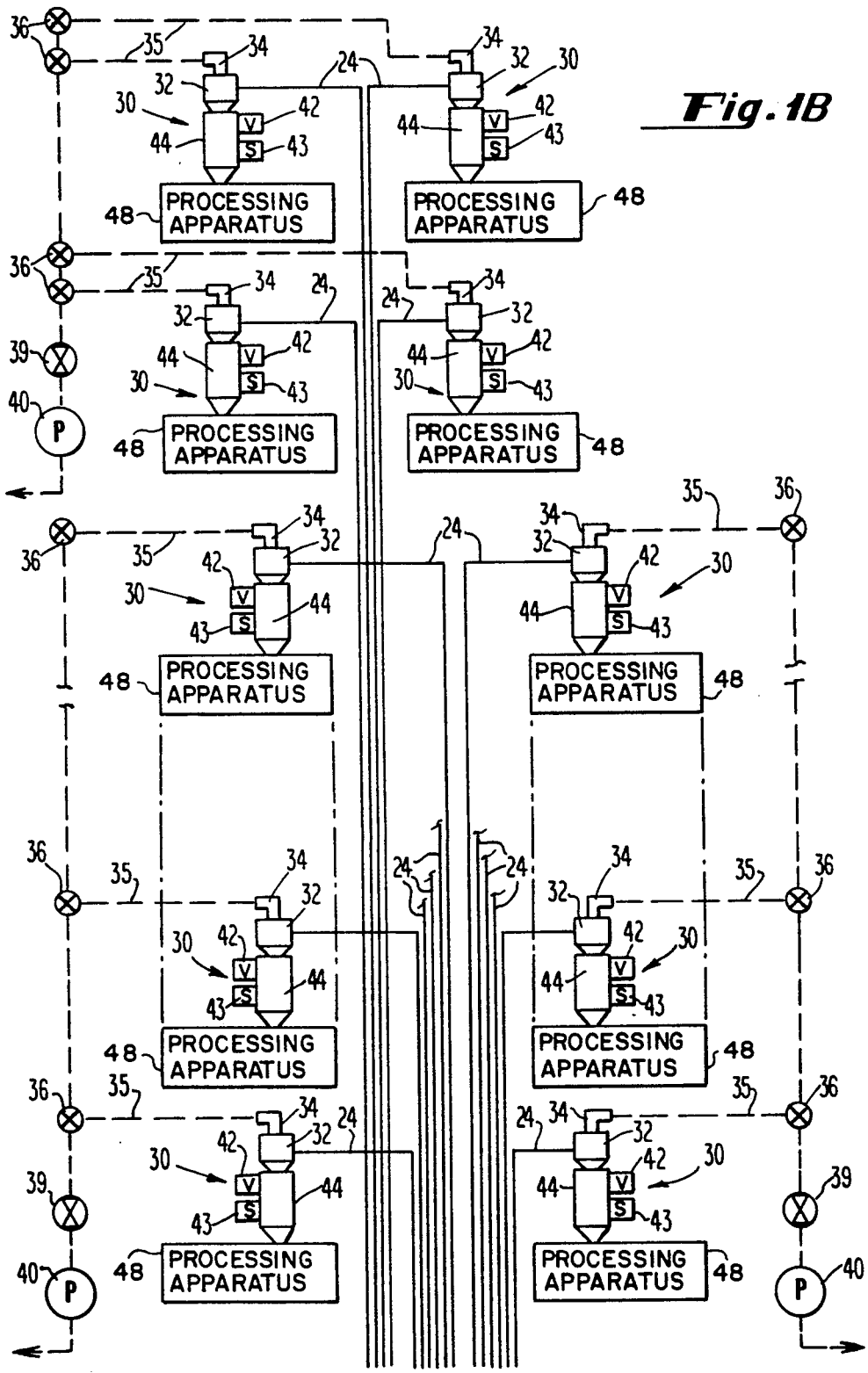

FIG. 1 is a schematic representation of a system for transporting material in particulate form from one of a number of sources to one of a number of processing stations in accordance with the invention. FIG. 1 has been divided into FIGS. 1A and 1B. With reference to FIG. 1A, there are shown a number of sources of materials 10. FIG. 1A depicts four such sources. However, as may be seen from FIG. 1A, more sources may be provided within the scope of the invention. As depicted in the Figure, each source is a hopper 10 for drying plastic in particulate form, and each of these drying hoppers may be a hopper of conventional design in which a batch of plastic material is being dried in order to prepare such material for processing. However, excellent results have been achieved using a drying hopper of the type disclosed in my co-pending application Ser. No. 07/359,218, filed May 31, 1989, now U.S. Pat. No. 5,019,994. In that co-pending application, there is disclosed a system for drying materials in a continuous feed process where materials are maintained in a state of constant dryness during interruptions in feed.

Each drying hopper 10 may nave a substantially inverted frusto-conical lower portion. An opening at the bottom of this lower portion is in communication with a discharge adaptor 12 of conventional design. Below each discharge adaptor 12 and in communication with the interior thereof there are three supply hopper dump valves 14. Each supply hopper dump valve may be any one of a number of material valves that are well-known in the art of material handling. By way of example, the supply hopper dump valve may be a butterfly valve. Each supply hopper dump valve 14 is controlled from a controller (not shown), the operation of which is explained in more detail below. Each supply hopper dump valve 14 is in communication with an upper end of a vertical tube 16. Each supply hopper dump valve has the capacity to hold material above it, or release material into the vertical tube 16 leading down from the supply hopper dump valve in response to a signal from the controller. In the illustrated embodiment, each hopper 10 has three supply hopper dump valves 14, each one of which is in communication with a vertical tube 16. It will readily be seen that there may be, in accordance with the invention, more or fewer supply hopper dump valves and vertical tubes leading from below each hopper.

Each vertical tube 16 terminates at a lower end opposite from the supply hopper dump valve in a filter 18. Each filter allows rapid intake of air through it but removes various particles that will be found in the air in a typical industrial setting. The direction of air flow is shown by the arrows leading to each filter 18. Each filter 18 may be any one of a number of filters of conventional design that are well-known in the arts of material handling. As will be seen in FIG. 1A, each vertical tube 16 has a Y-shaped intersection with a tube 20, which will be referred to as a "source tube." As depicted on FIG. 1A, each source tube 20 leads upward at an angle away from the vertical tube 16. However, source tube 20 may be horizontal in accordance with the invention.

Each source tube 20 terminates in an intake of a rotary valve 22. The operation of such rotary valves is well known in the art. A "rotary valve," by way of definition, has two substantially symmetric halves in its interior. In each half, a curved tube is rotatably mounted in the center. One end of each tube is always at the center of the rotary valve. The other end of each tube moves to connect with any one of a number of inlets. On the left-hand side, or intake side, of each rotary valve 22 shown in FIG. 1A, there is an inlet corresponding to each incoming source tube. On the right-hand side, or outlet side, of each rotary valve 22, there is an outlet corresponding to each destination tube 24. It will be seen that any inlet may be connected with any outlet. Thus, each source tube leading to a rotary valve may be connected, through the rotary valve, to each destination tube. The two rotatable tubes of each rotary valve are separately moved by electric motor, as is well-known in the art. Each motor is controlled by an electronic controller, the operation of which is described in more detail below. It is important that there be smooth interior walls where the various tubes meet in the interior of the rotary valve. If the walls are not smooth, material may become trapped, which will lead to contamination of material. Three rotary valves are depicted in FIG. 1A. However, the system may operate with more or fewer rotary values, depending on the number of sources and destinations.

With reference to FIG. 1B, each destination tube 24 has an outlet at a processing station 30. The processing station may be more generally referred to as a "destination." The end of the destination tube that is in communication with the processing station is referred to as the "destination end." For convenience, ten processing stations are shown in FIG. 1B, but more may be provided, as shown by the terminated additional destination tubes 24. Each processing station has an upper chamber 32. By way of example, the upper chamber may be cylindrical.

Each upper chamber has a tangential inlet vacuum chamber 34 leading upwardly therefrom. The tangential inlet vacuum chamber is a cylindrical tube in communication with the interior of the upper chamber through an aperture in the top of the upper chamber. The tangential inlet vacuum chamber is in turn attached by way of an air line 35 to a corresponding destination air valve 36. Destination air valves 36 are controlled by the electronic controller. Each destination air valve 36 is connected to a common air line 38, which leads to one of the pumps 40. Each pump 40 must be sufficiently powerful to create a sufficiently fast air flow that a minimal amount of material can remain in the tubes. By way of example only, it has been found that an air velocity of 4800 feet per minute is desirable. Along each air line 38, between the pump and the closest air valve, there is a vacuum breaker valve 39. The vacuum breaker valves are controlled by the controller. Each vacuum breaker valve may open the air line 38 so that air is no longer drawn through the system when the pump is running. This permits all the destination air valves 36 to be closed at one time, with the pump still running. Thus, the pump is not switched on and off frequently, which improves the reliability of the pump.

Each upper chamber 32 is connected by way of a material valve, which may be a standard butterfly valve well known in the art, and will be referred to here as a dump valve 42, to a lower chamber 44. The dump valve 42 is also controlled by the electronic controller. In a preferred embodiment, the lower chamber is cylindrical in form and has glass walls. Glass walls are desirable so that an operator may visually inspect the lower chamber to assure that the walls of the chamber are clean. In a preferred embodiment, the lower chamber is removable from its position for cleaning. Each lower chamber is provided with a level sensing means, such as a switch 43, which is located along the upper portion of the lower chamber. Switch 43 may be connected to the controller so as to indicate the quantity of material in the lower chamber.

It has been found to be desirable to provide small lower chambers for each processing station so that only a small amount of material is maintained at the processing station at any one time. For example, in one embodiment, it has been found desirable to use chambers having a capacity of approximately of 10 pounds of plastic material. By way of example, enough material to produce fewer than 10 articles (or ten shots) may be provided. The small quantity of material minimizes the possibility of hygroscopic materials being in an uncontrolled environment long enough to absorb water. Also, the proximity of the lower chamber to the processing machinery is advantageous. As a result of this proximity, heat from processing equipment maintains material at an elevated temperature, thus reducing the rate of absorption of water vapor. The small quantity of material makes it possible for the temperature to be raised without providing separate heating elements at each processing station. Notwithstanding the small amount of material, it is feasible to maintain a sufficient supply to keep the processing operation running smoothly. The operation of the system makes it possible quickly and frequently to replenish the material in the lower chamber. A valve separates the chamber from the processing apparatus 48, which may be an injection molding machine. This valve is controlled as part of the processing of the material, and is not a part of the invention.

The operation of the system is controlled by a microprocessor controller. The controller may receive signals representative of the status of each component of the system. For example, the controller may receive a signal to show the position of one of the tubes of the rotary valve or whether a given valve is open or closed. The controller may send signals to control the action of various components of the system. The control logic of such a controller is explained with reference to the flow chart depicted in FIG. 3. The first step, shown as the block 60, designated "BEGIN," shows when the controller is activated. The next block 62, marked "INITIALIZE SYSTEM," is used to indicate that the controller verifies the position or state of the components of the system that are operated by the controller. The control of each component is explained below in detail. Each processing station may be assigned an integral identification number. The next block, 64, marked "[N] EQUALS LAST STATION LOADED" indicates that the variable "N" will initially be assigned the integer identifying the most recent processing station to receive a delivery of material. Block 65, marked "VERIFY ROTARY VALVE POSITION," indicates that the controller checks the position of the outlet-side tube of the appropriate rotary valve to be sure that the outlet-side tube is in communication with the destination tube to the last processing station to receive material. This may be accomplished by various techniques well-known in the art of providing information to electronic controllers. If the position does not correspond, then the controller instructs the appropriate electric motor to move the rotatable outlet-side tube to the appropriate outlet. The next block 68 is labeled, "ENGAGE DDV[N] AND DTV[N]." "DDV" refers to the destination dump value, or the material valve between the upper and lower chambers of the processing station shown as 42 in FIG. 1B. "DTV" is the air valve corresponding to the processing station shown as in 36 FIG. 1B. Both these valves are opened.

The appropriate pump, 40 in FIG. 1B, is then turned on, as indicated by block 70, labeled "TURN ON PUMP." As shown in FIG. 1B, there may be more than one pump. The number of pumps will depend on such factors as the configuration of the processing stations. In operation of such a system, all pumps may be operated simultaneously. Air is then drawn through the tubing and through the upper chamber of the processing station. Any material that has been left in the tubing falls through to the lower chamber of the processing station, because the destination dump valve is open. The system remains in this configuration for the purge time. This is shown in block 72, labeled "WAIT FOR PURGE TIME P[N]." The purge time is defined as the amount of time required to remove all material from the tubes and the rotary valve. This purge time must be calculated for each processing station depending on the length of the tubing and the velocity of the air traveling through the tubing. After the purge time has elapsed, the appropriate air valve and the appropriate dump valve are closed, as shown by block 74 marked "DISENGAGE DDV[N] AND DTV[N]." The vacuum breaker valve 39 in FIG. 1B, then is opened, as shown by block 75, marked "ENGAGE VACUUM BREAKER." The controller then instructs the rotary valve tubing to move to the home position as indicated by block 76, labeled "MOVE ROTARY VALVE TO HOME POSITION." The home position is the ordinary position for starting the processing operation.

The controller then surveys all of the processing stations in order to see which, if any, are requesting material for processing operation. In the embodiment of the system depicted, each processing station may have associated with it a control panel electrically connected to the controller by techniques well known in the art. An operator at such a control panel may request a certain type of material. The operator may designate the material by selecting a particular source or sources on the control panel. The operator would have observed that the proper processing equipment, such as a mold, is in place and that the lower chamber is clean. The operator would then set a switch or other input to indicate electronically that that station is ready to receive material. Such an electronic indication constitutes requesting material. In the loop indicated in FIG. 3, initially the controller begins the survey with the station identified by the number 1, as indicated by block 78, "SET STATION # [N] TO 1." In the next step, the controller determines whether the operator of the first station has indicated that there is a need for material, as indicated by block 80, marked "IS DESTINATION [N] CALLING FOR MATERIAL?" If the answer is "NO," then the controller moves on to the next station, as indicated by the arrow in the line leading to block 82, labeled "N=N+1."

Figure 2A:
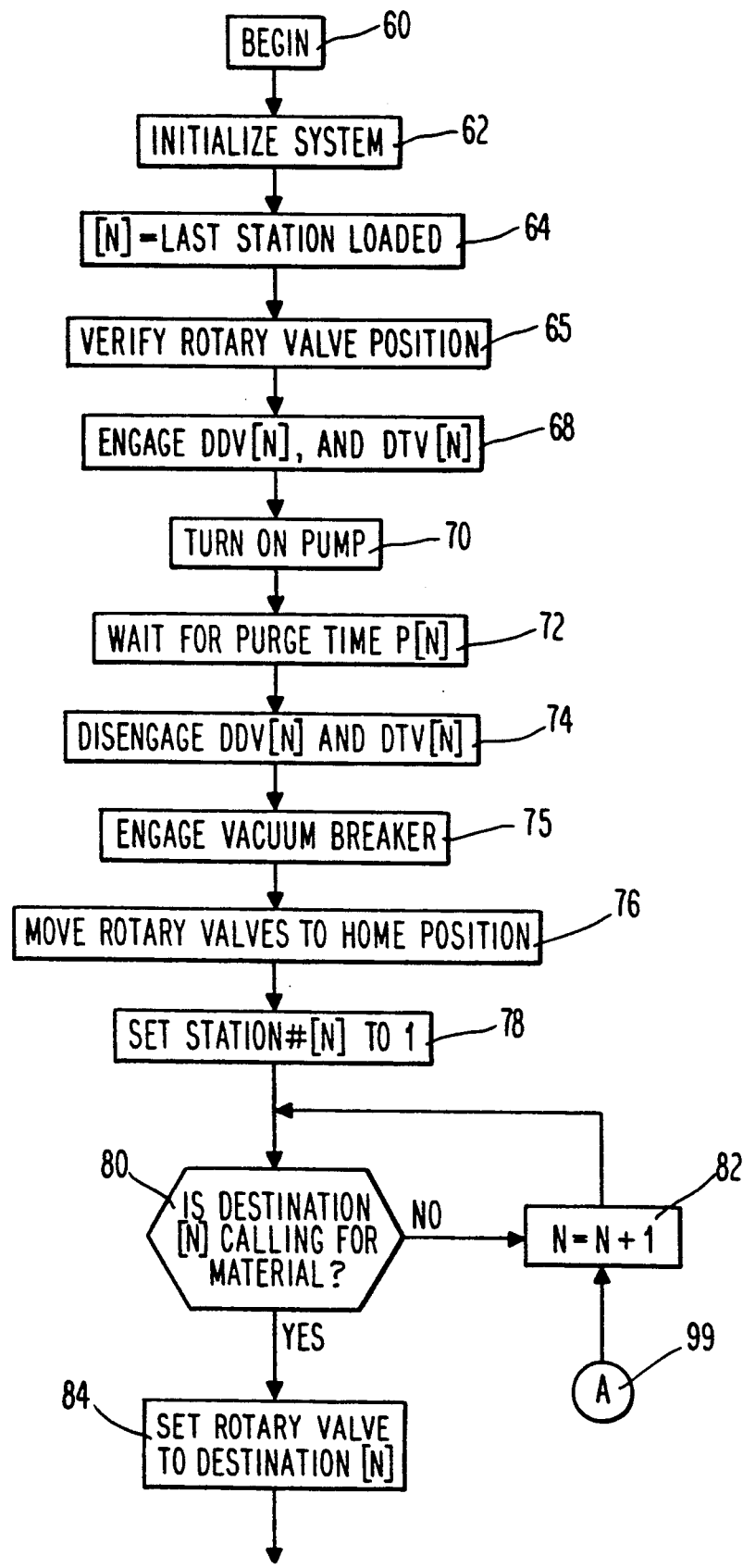
FIG. 2 is a block diagram of the control logic of a controller according to the invention.
Figure 2B:
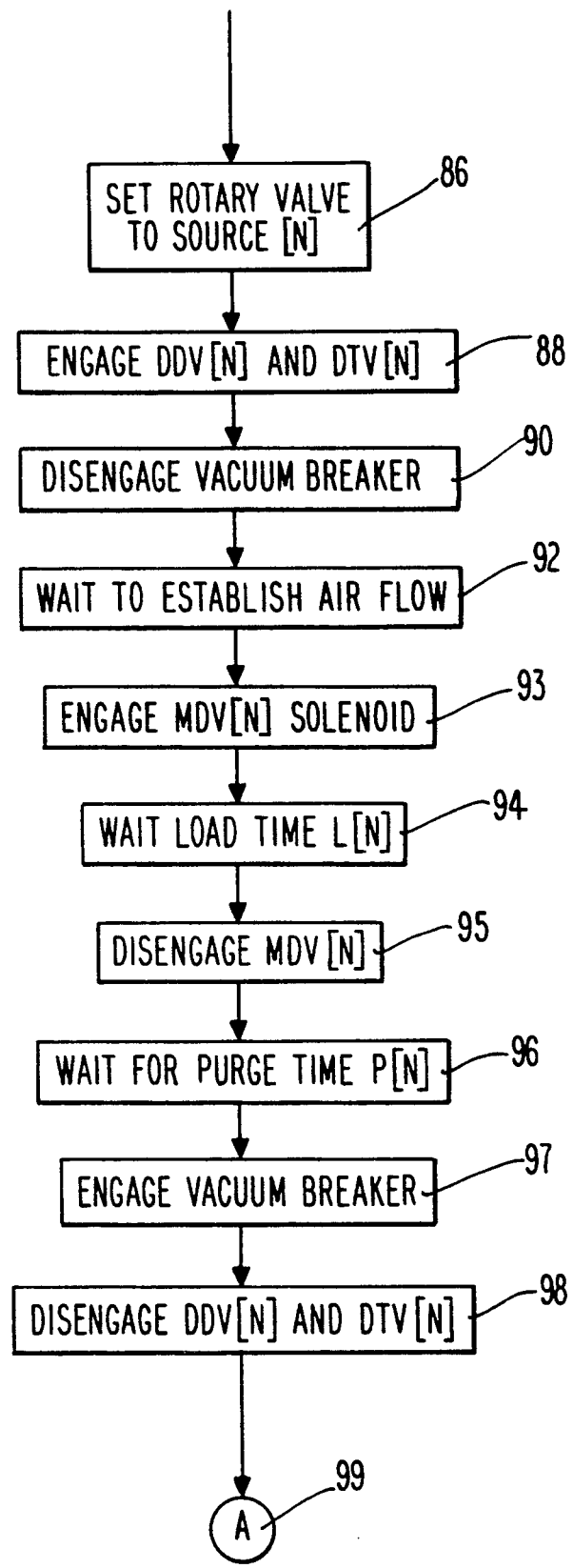

When destination N is requesting material, the controller manipulates the system in a series of steps to have material delivered to destination N. In the first such step, the tube of the rotary valve that connects to the outlets, is moved to feed the destination tube N, as indicated by block 84, marked "SET ROTARY VALVE TO DESTINATION [N]." A source of material must be selected. The operator of the processing station may select a source of material in one embodiment as noted above. In an alternative embodiment, a central control may select the source of material. The source will be identified by the processing station that is requesting the material. Thus, for a processing station identified by the integer N, there is a source, which may be referred to as SOURCE [N]. The tube of the rotary valve that is connected to the inlets, or the left-hand tube, will be rotated to receive material from the selected source. Referring to the second sheet of FIG. 2, this step is indicated by block 86, marked "SET ROTARY VALVE TO SOURCE [N]." The dump valve and air valve corresponding to the destination processing station are opened by the controller, as indicated by block 88, marked "ENGAGE DV[N] AND DTV[N]."

The next step is disengaging the vacuum breaker corresponding to the appropriate pump, as indicated by block 90, marked "DISENGAGE VACUUM BREAKER." A predetermined period of time is then allowed to elapse. This period of time is long enough for a flow of air of the full velocity to become established through the tubing from the source to the destination. The length of this predetermined period of time is calculated based on the rate of air flow and the length of tubing involved for each source and each destination in the system. A computerized controller may be programmed automatically to wait for the proper period of time for each source and destination pair. This step is indicated by block 92, marked "WAIT TO ESTABLISH AIR FLOW."

Once the flow of air is established, material may be released into the flow of air. The precise amount of material to be released is controlled by the amount of time the material dump valve, at the bottom of the source hopper, is open. A solenoid controls this valve in a conventional manner. This step is indicated by the block 93, marked "ENGAGE MDV[N] SOLENOID." A predetermined period of time, which is sufficiently long to allow the desired amount of material from the hopper to fall into the tubing, is then allowed to elapse. The predetermined period of time is referred to as the "load time." This step is indicated by block 94, marked "WAIT LOAD TIME [N]." When the load time has elapsed, the dump valve is closed, as shown in block 95, marked "DISENGAGE MDV[N]." The system then remains in this orientation while the appropriate purge time from the source to the destination elapses, as shown by block 96, marked "WAIT FOR PURGE TIME P[N]." As discussed above, the purge time must be calculated with respect to each pair of source and destination based on the length of tubing and the speed with which air moves in the system. The purge time must be sufficiently long to ensure that all particles are removed from the lines or tubes leading from the source to the destination. The removal of such particles permits other material to be delivered to a different destination without shutting down the system for cleaning.

After the purge time has elapsed, the vacuum breaker in the system is engaged, as shown by block 97, marked "ENGAGE VACUUM BREAKER." Air is thus no longer flowing through the tubes from the source to the destination. At this point, the appropriate dump valve in the processing station and the air valve corresponding to that processing station may be closed, as indicated by block 98, marked "DISENGAGE DDV[N] AND DTV[N]." This step completes delivery of the appropriate amount of material.

The controller then checks the next processing station to see if that station is calling for material. This is indicated on the diagram by the circle 99, marked "A," which appears at the end of the second sheet of the flow diagram of FIG. 2 and on the first sheet of the flow diagram of FIG. 2.

Figure 3:
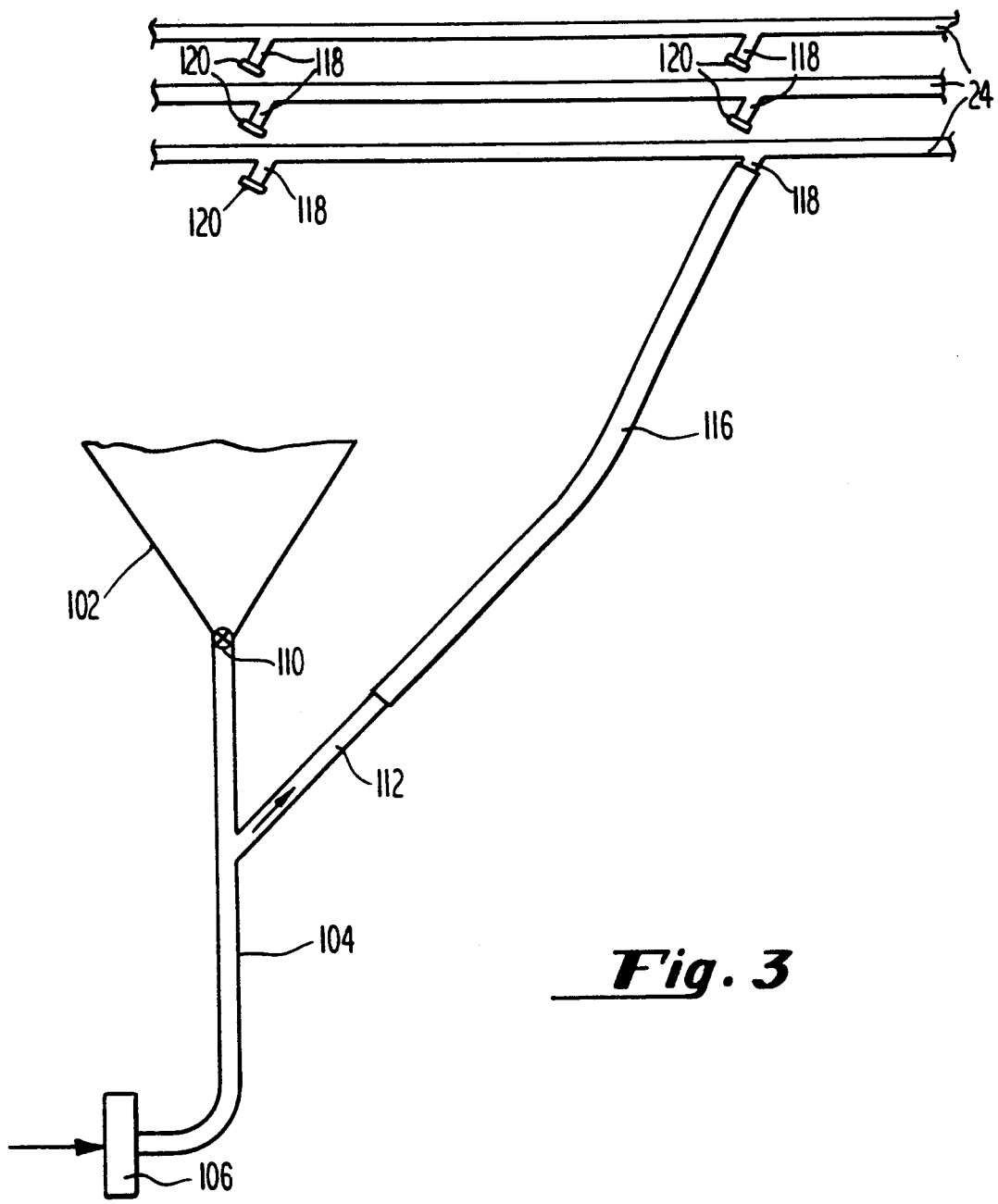
FIG. 3 is a schematic diagram of an alternative embodiment of a portion of a system according to the invention.

FIG. 3 depicts an alternative embodiment of a portion of a system, wherein the rotary valve is not used. Referring to FIG. 3, a hopper 102 contains material in particulate form. As shown, the hopper has a substantially frusto-conical base with an opening at the bottom of the base. A substantially vertical tube 104 leads down from the base of hopper 102. The lower end of vertical tube 104 terminates at an air filter 106. The arrows show the direction of air flow. A material valve 110 separates the hopper 102 from the vertical tube 104. Material valve 110 may be, for example, a conventional butterfly valve. Tube 112 intersects the vertical tube 104. Tube 112 may be located so that the angle between the upper portion of the vertical tube 104 and tube 112 is less than 90 degrees.

Destination tubes 24 are shown. Each leads to a processing station on the right, as shown in FIG. 1B. Referring to FIG. 3 again, each destination tube 24 includes a "Y" lateral fitting 118. If there are a number of hoppers 102, then there may be a "Y" lateral fitting in each tube 24 at a point convenient to each such hopper 102. Several "Y" lateral fittings 118 are shown closed by caps 120. One "Y" lateral fitting is shown connected by flexible hose 116 to tube 112. The connections between tube 112 and flexible hose 116, and flexible hose 116 and "Y" lateral fitting 118, are made manually. In this embodiment, it is not necessary to employ a rotary valve. The controller activates and establishes a flow of air, opens material valve 110 for a predetermined period of time, and maintains the air flow long enough to allow the material to reach the processing station, and then continues the air flow for a predetermined period of time sufficient to remove all or substantially all residual material from tubes 104, 112, and 24, and flexible hose 106.

It will be appreciated that there are considerable variations that can be accomplished in a system and a method of the invention without departing from its scope. As a result, although a preferred embodiment of a system and a method of the invention has been described above, it is emphasized that the invention is not limited to a preferred embodiment, and there exist alternative embodiments that are fully encompassed within the invention's scope, which is intended to be limited only by the scope of the appended claims.

What is claimed is:

1. A system for delivering predetermined amounts of material in particulate or pulverulent form from a selected one of a plurality of sources to a selected one of a plurality of destinations, comprising:
   (a) a plurality of source tubes, a portion of each of which is in proximity to one source;
   (b) a plurality of destination tubes, each of which is in physical communication with one destination at a destination end;
   (c) connecting means whereby each source tube may be in physical communication at a given time with one of a plurality of destination tubes and each destination tube may be in physical communication at a given time with one of a plurality of source tubes;
   (d) air flow means for providing a flow of air through a selected source tube, said connecting means, and a selected destination of tube in physical communication with the selected source tube;
   (e) introducing means for introducing material from each source to one of said source tubes which corresponds to said source;
   (f) control means for: (i) controlling said connecting means so as to render a selected source tube in physical communication with a selected destination tube; (ii) controlling said air flow means so as to establish a flow of air through said selected source tube, said connecting means, and said selected destination tube; (iii) controlling said introducing means so as to introduce a selected quantity of material from a selected source into said selected source tube; (iv) controlling said air flow means so as to maintain said flow of air for a predetermined period of time sufficient to allow said selected quantity of material to reach said selected destination; and (v) continuing said air flow for an additional predetermined period of time sufficient to remove all residual material from said selected source tube, said connecting means and said selected destination tube.

2. A system as recited in claim 1, wherein said connecting means comprises at least one rotary valve, each rotary valve having at least two inlet ports in physical communication with source tubes and at least two outlet ports in physical communication with destination tubes.

3. A system as recited in claim 1, wherein said air flow means comprises:
   (a) one or a plurality of pumps;
   (b) a plurality of air lines connecting each of said destination tubes to one of said pumps;
   (c) a destination valve corresponding to each destination, whereby said air lines may be open or closed with respect to each destination; and
   (d) a vacuum breaker valve in said air lines whereby said air flow may be interrupted.

4. A system as recited in claim 3, wherein said control means further comprises means for controlling each of said destination valves, whereby said air flow is established to only one selected destination at one time.

5. A system as recited in claim 3, wherein said control means further comprises means for controlling said vacuum breaker valve (i) to establish said air flow when a selected source tube and a selected destination are in physical communication, and (ii) to stop said air flow when said period of time sufficient for said selected amount of material to reach the selected destination has elapsed.

6. A system as recited in claim 1, wherein each source is above the source tube corresponding to said source, and wherein each one of said introducing means comprises a material control valve located below said source and above said corresponding source tube.

7. A system as recited in claim 6, wherein said control means further comprises means for controlling each one of said material control valves to open for a predetermined load time sufficient to introduce a selected amount of material into the corresponding source tube.

8. A system as recited in claim 1, further comprising operator interface means, whereby an operator may instruct said control means to select a particular source and a particular destination.

* * * * *